United States Patent [19]

Jenkins

[11] 4,105,934
[45] Aug. 8, 1978

[54] MAGNETIC TAPE REPRODUCER WITH SERIES INTERCONNECTED TORQUE MOTORS IN PLAY MODE

[75] Inventor: John P. Jenkins, Towanda, Ill.

[73] Assignee: International Tapetronics Corporation, Bloomington, Ill.

[21] Appl. No.: 677,539

[22] Filed: Apr. 16, 1976

[51] Int. Cl.$^2$ ............................................ B65H 77/00
[52] U.S. Cl. ........................................ 318/7; 318/113
[58] Field of Search .................................. 318/7, 113

[56] References Cited
U.S. PATENT DOCUMENTS

| | | | |
|---|---|---|---|
| 3,501,682 | 3/1970 | Jacoby | 318/7 |
| 3,512,733 | 5/1970 | Ault | 318/7 X |
| 3,594,620 | 7/1971 | Husted et al. | 318/113 X |
| 4,012,674 | 3/1977 | Spitsbergen et al. | 318/7 |

Primary Examiner—B. Dobeck

Attorney, Agent, or Firm—McCaleb, Lucas & Brugman

[57] ABSTRACT

Reproducing apparatus for magnetic tape in which the forward and rewind torques motors are series-interconnected to moderate their torques and limit the tape tension during play mode only, thereby eliminating the large heat-generating resistors required when the torque motors are parallel-connected by the conventional arrangement. Relatively small variable resistor means is provided in the power supply to the series-interconnected torque motors, enabling adjustment of tape tension in the play mode. In the specific embodiment illustrated, the variable resistor means comprises two individual resistors. Switch means selectively connects one or both resistors into the torque motor power supply circuit to keep tape tension within a predetermined range during play mode for different size tape reels.

8 Claims, 2 Drawing Figures

MAGNETIC TAPE REPRODUCER WITH SERIES INTERCONNECTED TORQUE MOTORS IN PLAY MODE

CROSS REFERENCES TO RELATED APPLICATIONS

Reference is made to the following copending related United States patent applications assigned to the same assignee: Jenkins Application Ser. No. 678,307 Filed Apr. 19, 1976 on MAGNETIC TAPE REPRODUCING APPARATUS WITH MANUALLY OVERRIDABLE CONNECTION BETWEEN TAPE LIFTER AND PRESSURE ROLLER, now U.S. Pat. No. 4,040,114; Jenkins Application Ser. No. 675,987 Filed Apr. 12, 1976 on MAGNETIC TAPE REPRODUCER.

BACKGROUND OF THE INVENTION

This invention relates to reproducing apparatus for magnetic tape and particularly to such apparatus for use in commercial radio broadcasting where it may be required to operate continuously with the highest possible standards of reliability and durability.

Typically, such apparatus is selectively operable in at least three basic modes, namely: play, fast forward and fast rewind.

In play mode, forward and rewind reels are urged in opposite directions by torque motors to tension the tape, a tape lifter lowers the so-tensioned tape onto the reproducing head, and a pressure roller presses the tape into frictional driving engagement against a capstan to move the tape in a forward direction at a lineal play speed determined by the rotational speed of the capstan. When conventional reproducing apparatus is in play mode the torque motors are simultaneously energized through individual relatively large resistors to limit their respective torques to values just sufficient to provide the tape tension required. Continuous operation in play mode causes these relatively large torque-limiting resistors to generate and build up heat within the cabinet. This is objectionable and often requires design compromises in the form of special venting arrangements or blowers to keep the temperature in the cabinet within tolerable limits.

In either fast mode, only the appropriate forward or rewind torque motor is energized, the tape lifter lifts the tape clear of the head, and the pressure roller is held away from the capstan to free the tape from the capstan and enable the tape to be moved at full fast speed determined by the speed of the energized torque motor and the diameter of wrap on the reel of the energized motor. The other torque motor is non-energized, allowing its associated reel to pay off tape freely. The conventional torque-limiting resistors referred to above, will generally be by-passed during either fast mode because no hold-back tension on the tape is required.

BRIEF SUMMARY OF THE INVENTION

A general object of the invention is to provide magnetic tape reproducing apparatus which is simple and inexpensive to manufacture and operate and is capable of continuous operation without objectionable heat generation while meeting the highest standards of reliability and durability required by the broadcasting industry.

An important object is to provide such apparatus in which the forward and rewind torque motors are automatically series-interconnected in play mode, thereby employing the reactances of the motors themselves to control the tape tension instead of using large heat-generating resistors for this purpose.

Another object is to provide variable resistor means in the power supply to the series-interconnected torque motors to adjust the tape tension during play mode.

Another object is to provide separate branches of the play mode circuit which are selectable for large and small reels, the branches having different resistors to compensate for different reel sizes and thereby maintain the tape tension within a predetermined range for different size reels.

Another object is to provide variable resistors in the power supply to the series-interconnected torque motors to adjust the tape tension in play mode for large and small reels.

GENERAL DESCRIPTION OF THE DRAWINGS

Other objects and advantages will be apparent from the following description taken in connection with the drawings in which:

FIG. 1 is a front overall view of a reproducing apparatus employing the present invention; and FIG. 2 is a circuit diagram showing a preferred embodiment of the invention employed in the apparatus of FIG. 1.

Like parts are designated by like reference characters throughout the figures of the drawings.

DETAILED DESCRIPTION OF THE PREFERRED EMBODIMENT

Figure 1:
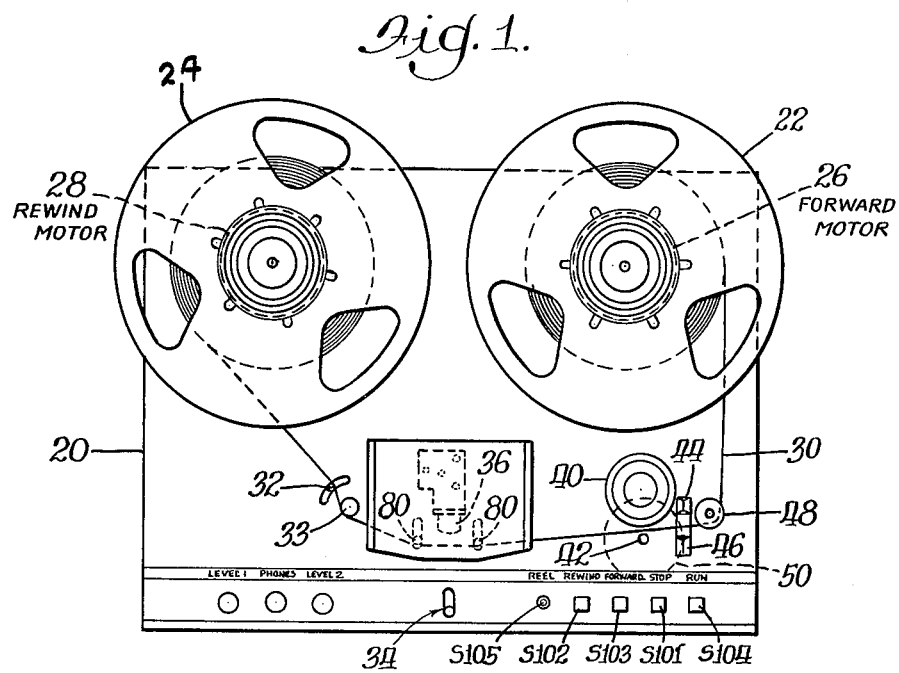

Referring now to the drawings, the apparatus comprises a tape deck housing 20 having forward and rewind reels 22 and 24 driven by forward and rewind motors 26 and 28 respectively. The reels may be of the standard, large 10½ inches diameter or the standard small 7 inches diameter. The ends of a magnetic tape 30 are wrapped about the reels and the tape is trained along a path across a tensioning arm 32, guide roller 33, lifter bars 80 of a tape lifter assembly generally designated 34, a reproducing head 36, between a pressure roller 40 and capstan 42, between an infrared lamp 46 and infrared sensor 44, and across a guide roller 48. A capstan motor 50 drives the capstan 42 continuously at a constant rotational speed. The capstan motor 50 may be completely independent of the other electrical components and continuously energized for constant operation during the life of the apparatus. For this reason it is omitted from the circuit diagram in FIG. 2 which will now be described.

Each of the torque motors 26, 28 has a conventional, spring-applied friction brake (not shown) to stop it upon being deenergized and prevent overrunning and looping of tape. Brake release solenoids L1 and L2, when energized, release these brakes on the respective torque motors.

There are two power sources for the apparatus. An alternating current power source 52, which may be at nominal 110 volts supplies alternating current power to torque motors 26, 28; and it supplies a full wave bridge rectifier CR3 which furnishes direct current to operate the brake solenoids L1 and L2 above described, and to operate pinch solenoid L3. When energized, pinch solenoid L3 moves the pressure roller 40 downward (in FIG. 1) and presses the tape 30 into frictional driving engagement with the capstan 42. When solenoid L3 is deenergized, a spring (not shown) moves the pressure roller 40 upward, allowing the tape to disengage from the capstan. Such arrangements for operating pressure rollers are well-known in the art so a detailed description and showing will not be included here. Reference however may be made to applicant's above mentioned U.S. Pat. No. 4,040,114 showing one improved form of such arrangement.

Figure 2:
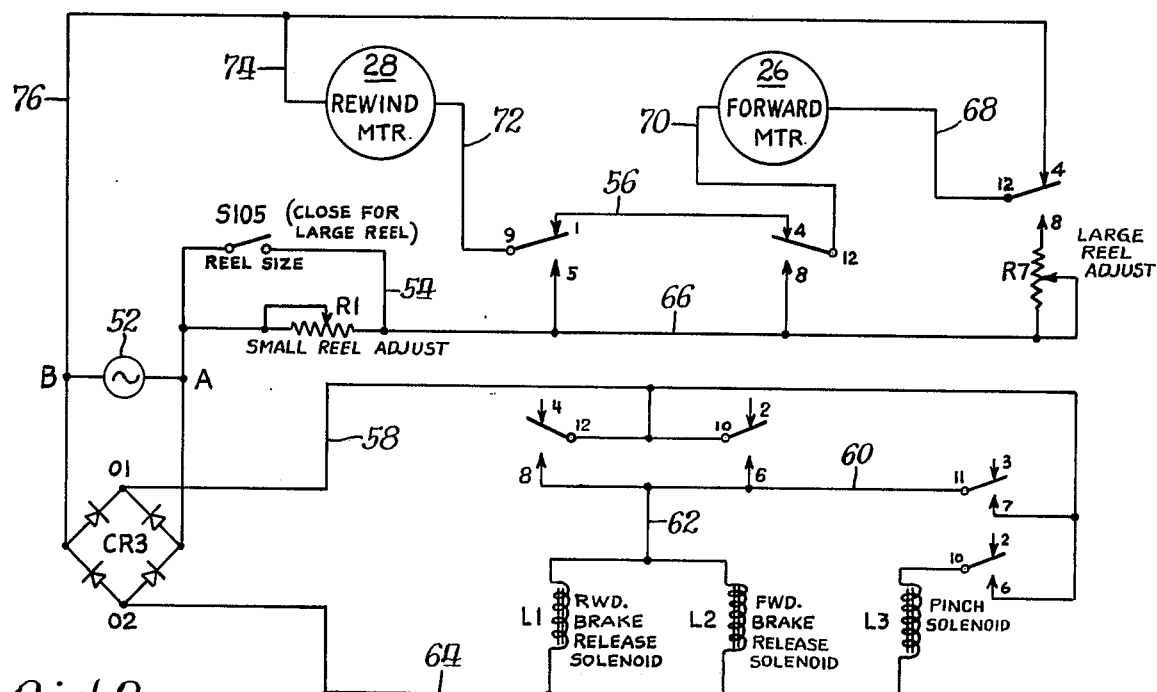
Figure 2:
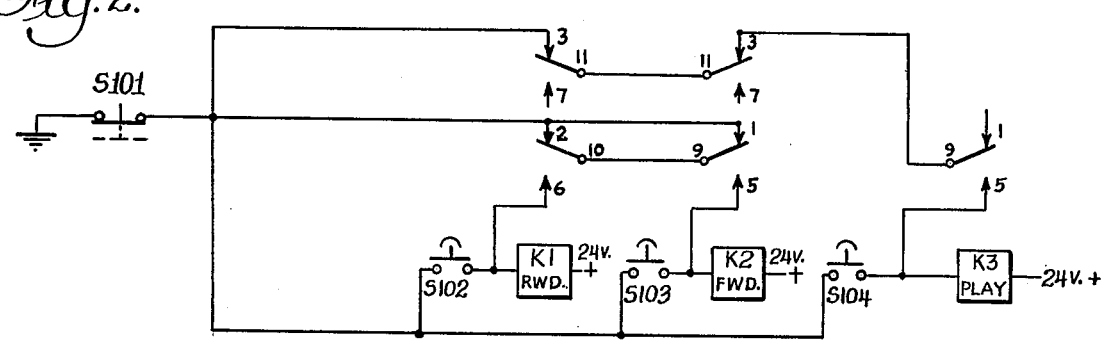

The other power source is illustrated at 24-volt direct current source applied to control relays K1, K2 and K3 as shown in FIG. 2.

The crux of the present invention illustrated in FIG. 2 is in variable resistor means R1 and R7, switch S105 in bypass conductor 54 paralleling R1, and crossover conductor 56. As will be explained, R1 is a variable resistor to adjust the tape tension for small reels, and R7 is a variable resistor to adjust the tape tension for large reels, switch S105 is closed for large reel operation and opened for small reel operation, and crossover 56 provides a direct series-interconnect for torque motors 26, 28 in play mode.

Use and operation of the apparatus in play, fast forward and fast rewind modes will now be described.

Play Mode

Assuming main or stop switch S101 is closed, grounding the control circuit for relays K1, K2 and K3, the apparatus is placed in play mode by a momentarily closing start or run switch S104. This energizes play relay K3. It is held energized to ground through its own latching contacts 5 and 9 and a holding circuit including contacts 3 and 11 each of K1 and K2, and switch S101.

Both brake release solenoids L1 and L2 are energized to release the brakes on motors 26 and 28 through a circuit which may be traced as follows:

Output terminal 01 of CR3, conductor 58, contacts 7 and 11 of K3, conductors 60 and 62, L1 and L2, conductor 64, and output terminal 02 of CR3. Likewise, the pinch solenoid L3 is energized through conductors 58 and 64 and contacts 6 and 10 of K3.

By means not specifically shown here, but illustrated and described in detail in applicant's above mentioned U.S. Pat. No. 4,040,114, energization of the pinch solenoid L3 simultaneously moves the pressure roller 40 downward pressing the tape into frictional driving engagement with the capstan 42, and moves the tape lifters bars 80 out of the way (upward in FIG. 1) so the tape 30 can engage the face of the head 36.

The torque motors 26 and 28 are simultaneously energized, pulling the opposite ends of the tape to tension it against the head 36. It will be understood that the torque motors substantially neutralize one another and therefore are not responsible for any movement of the tape in play mode. Actual tape movement is the result of the frictional driving engagement with the capstan, the lineal play speed of the tape being determined by the fixed rotating speed of the capstan.

Assuming the reel size switch S105 is open as shown in FIG. 2, the apparatus will be adjusted for operation with small reels 22 and 24, for instance, the small 7 inches diameter size mentioned. The torque motors in this case will be energized from the AC power source 52 through a circuit which may be traced as follows:

Power terminal A, variable resistor R1, conductor 66, variable resistor R7, contacts 8 and 12 of K3, conductor 68, motor 26, conductor 70, contacts 4 and 12 of K2, crossover conductor 56, contact 1 and 9 of K1, conductor 72, motor 28, conductors 74 and 76, and power terminal B.

In the condition just described, namely with the reel size switch S105 open, for small reel operation, the series-interconnected torque motors 26 and 28 are energized through both variable resistors R1 and R7. This is because a given amount of torque exerted by the torque motors on small reels produces a higher tape tension than the same torque exerted on large reels; hence, the torque input to the small reels must be reduced by using both resistors. Preferably resistor R1, which is used to adjust the tape tension with small reels, will be larger than the resistor R7 which is used to adjust the tension for large reels. In one specific example, in apparatus made for optional use on 7 inches or 10½ inches diameter reels, applicant has had excellent results with R1 and R7 valued at 250 and 150 ohms respectively.

By closing reel size switch S105, it bypasses variable resistor R1. In that case, only variable resistor R7 limits current flow to the torque motors 26 and 28, enabling them to apply higher torques to compensate for the larger diameters of the larger reels.

In practice, the motor torque for large reels will first be set by adjusting the variable resistor R7, with the reel size switch S105 closed. Once this adjustment has been made, switch S105 will be opened and variable resistor R1 will then be adjusted for small reels.

Fast Forward Mode

The apparatus is placed in fast forward mode by momentarily closing switch S103. This energized relay K2. It will be held energized through its own latching contacts 5 and 9 and a holding circuit extending back to ground through contacts 2 and 10 of K1, and main or stop switch S101.

Brake release solenoids L1 and L2 will be energized from output terminals 01 and 02 of CR3 through contacts 6 and 10 of K2. Pinch solenoid L3 will not be energized, so the pressure roller 40 will remain spaced from the capstan 42 and the tape will be free to run past the capstan while tape lifter bars 80, 80 hold the tape away from the head as shown in FIG. 1.

The forward torque motor 26 alone will be energized through a circuit traced as follows:

Terminal A of power source 52, resistor R1 for small reels or switch S105 for large reels, conductor 66, contacts 8 and 12 of K2, conductor 70, motor 26, conductor 68, contacts 4 and 12 of K3, and conductor 76 to terminal B. Rewind torque motor 28 is not energized. Its brake having been released by solenoid L1, reel 24 is free to pay off tape as fast as motor 26 can turn.

For fastest operation in the fast forward mode, switch S105 may be closed to bypass R1.

Fast Rewind Mode

The apparatus is placed in fast rewind mode by momentarily closing switch S102. This energizes relay K1. It will be held energized through its own latching contacts 6 and 10 and a holding circuit extending back to ground through contacts 1 and 9 of K2, and main or stop switch S101.

Brake release solenoids L1 and L2 will be energized from output terminals 01 and 02 of CR3 through contacts 8 and 12 of K1. Pinch solenoid L3 will not be energized, so the pressure roller will remain spaced from the capstan and the tape will be free to run past the capstan while tape lifter bars 80, 80 hold the tape away from the head as shown in FIG. 1.

The rewind torque motor 28 alone will be energized through a circuit traced as follows:

Terminal A of powr source 52, resistor R1 for small reels or switch S105 for large reels, contacts 5 and 9 of K1, conductor 72, motor 28, and conductors 74 and 76 back to terminal B. Forward torque motor 26 is not energized. Its brake having been released by solenoid L2, reel 22 is free to pay off tape as fast as motor 28 can turn.

For fastest operation in the fast rewind mode, switch S105 may be closed to bypass R1, as described above in connection with the fast forward mode.

While one form in which the present invention may be embodied has been shown and described, it will be understood that various modifications and variations thereof may be effected without departing from the spirit and scope of the invention as defined by the appended claims. For example, if only a single size reel is to be used with the apparatus, variable resistor R1 may be eliminated. Further, one or both of the resistors R1 and R7 may be fixed and not variable.

The embodiments of the invention in which an exclusive property or privilege is claimed are defined as follows:

1. In transducing apparatus for a magnetic tape trained between forward and rewind reels for movement past a transducing head and between a rotatable capstan and a pressure roller movable toward and away from the capstan, tape drive means including a capstan motor for rotating the capstan at constant speed and forward and rewind torque motors operating at normal voltage connected to the forward and rewind reels to move the tape in forward and rewind directions respectively, control means including a transducing mode circuit selected to place the apparatus in transducing mode in which both torque motors are simultaneously energized to rotate the reels in opposite directions to tension the tape across the head and the pressure roller is moved to press the tape into frictional speed-limiting driving engagement with the capstan, the control means further including a fast mode circuit selective to place the apparatus in a fast mode in which the pressure roller is moved to free the tape from the capstan while only one of the torque motors is energized at a predetermined voltage to wrap the tape at fast speed onto its corresponding reel while the other torque motor is deenergized to enable the tape to unwrap freely from the other reel, the improvement comprising:
    means included in said transducing mode circuit for connecting said torque motors in series across said predetermined voltage to reduce the current through both motors during said transducing mode to limit the tension applied to said tape.

2. In transducing apparatus, the improvement of claim 1 in which said transducing mode circuit includes variable resistor means in series with the torque motors in transducing mode, and means to selectively vary said resistor means to compensate for different size reels.

3. In transducing apparatus, the improvement of claim 2 in which said variable resistor means includes a plurality of individual resistors and switch means selective to vary the number of said resistors in series with said torque motors in transducing mode.

4. In transducing apparatus, the improvement of claim 3 in which said transducing mode circuit includes a by-pass conductor in parallel with a portion of said plurality of resistors, and said switch means is located in said by-pass conductor.

5. In transducing apparatus, the improvement of claim 2 in which said variable resistor means includes first and second resistors connected in series, at least one of said resistors being a variable resistor, and switch means by-passing one of said resistors, said switch means when closed and opened rendering the apparatus usable on larger and smaller reels respectively while maintaining tape tension within a predetermined range for both size reels.

6. In transducing apparatus, the improvement of claim 5 in which both of said first and second resistors are variable resistors, said first resistor is variable to adjust the tape tension in transducing mode with larger reels, and said second resistor is variable to adjust the tape tension in transducing mode with smaller reels.

7. In apparatus, the improvement of claim 6 in which said second resistor has a larger resistance value than said first resistor.

8. In transducing apparatus, the improvement of claim 7 in which said switch means by-passes said second resistor.

* * * * *

UNITED STATES PATENT OFFICE
CERTIFICATE OF CORRECTION

Patent No. 4,105,934  Dated August 8, 1978

Inventor(s) John P. Jenkins

It is certified that error appears in the above-identified patent and that said Letters Patent are hereby corrected as shown below:

Col. 5; line 1 - "powr" should be -- power --

Col. 6; line 38 - before "apparatus" insert -- transducing --

Signed and Sealed this

Sixth Day of February 1979

[SEAL]

Attest:

RUTH C. MASON
Attesting Officer

DONALD W. BANNER
Commissioner of Patents and Trademarks